Figure 1:
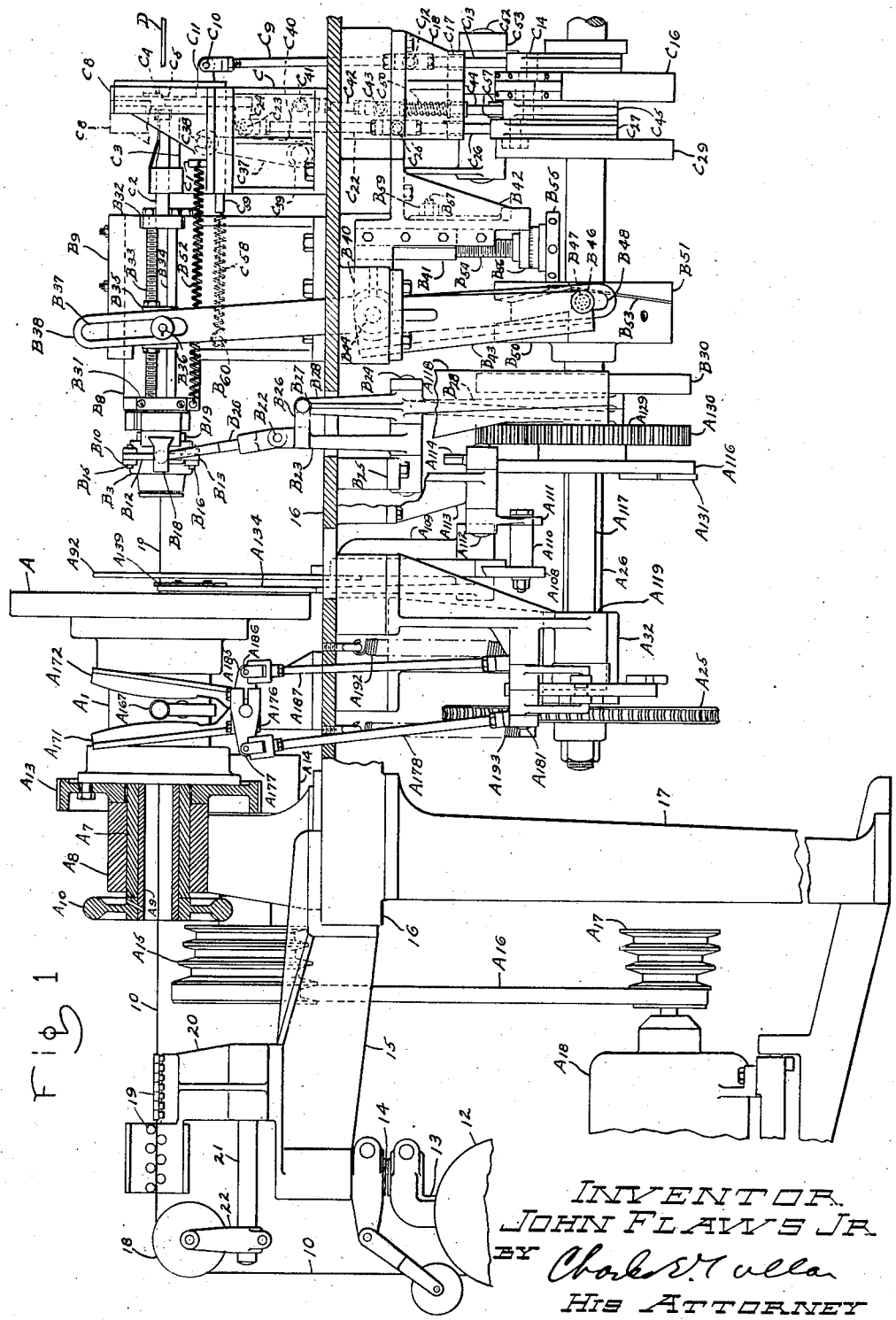

March 12, 1935. J. FLAWS, JR 1,994,307
METHOD AND MACHINE FOR MAKING GRIDS
Filed June 4, 1932 9 Sheets-Sheet 1

INVENTOR
JOHN FLAWS JR
BY Charles T. Mullan
HIS ATTORNEY

March 12, 1935. J. FLAWS, JR 1,994,307
METHOD AND MACHINE FOR MAKING GRIDS
Filed June 4, 1932 9 Sheets-Sheet 2
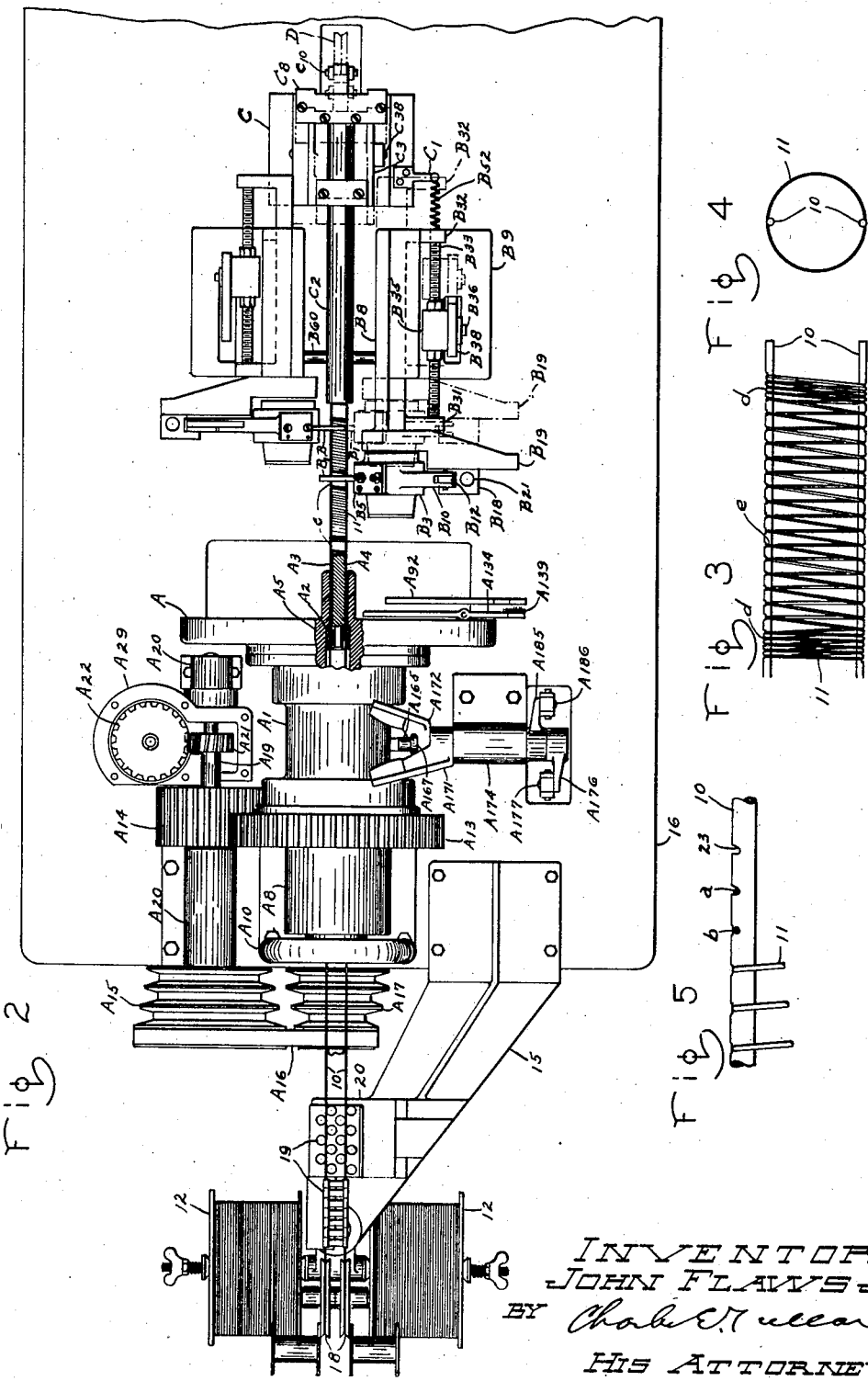
INVENTOR.
JOHN FLAWS JR
BY Chas. E. Mullen
HIS ATTORNEY March 12, 1935.  J. FLAWS, JR  1,994,307
METHOD AND MACHINE FOR MAKING GRIDS
Filed June 4, 1932   9 Sheets-Sheet 3
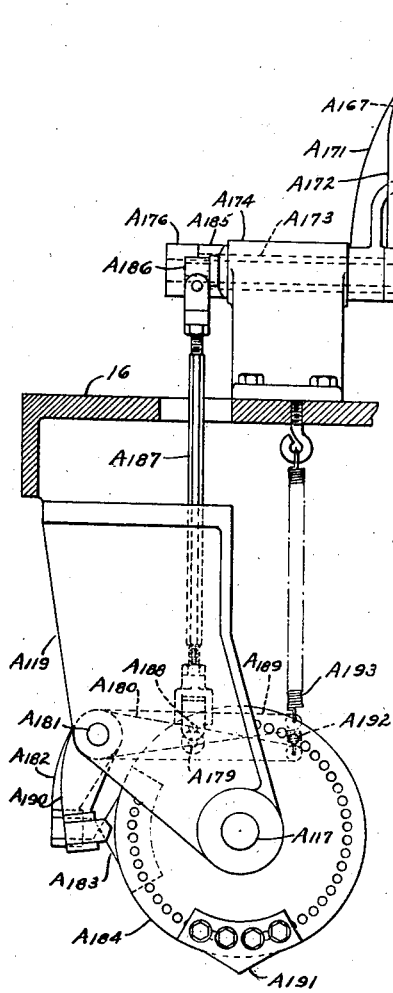
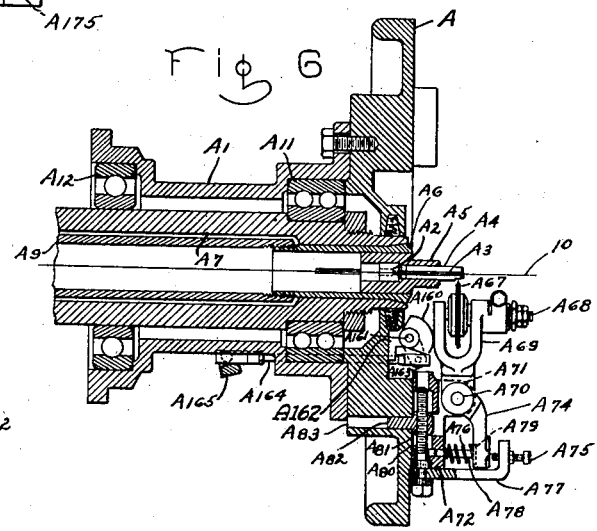
INVENTOR
JOHN FLAWS JR.
BY
HIS ATTORNEY

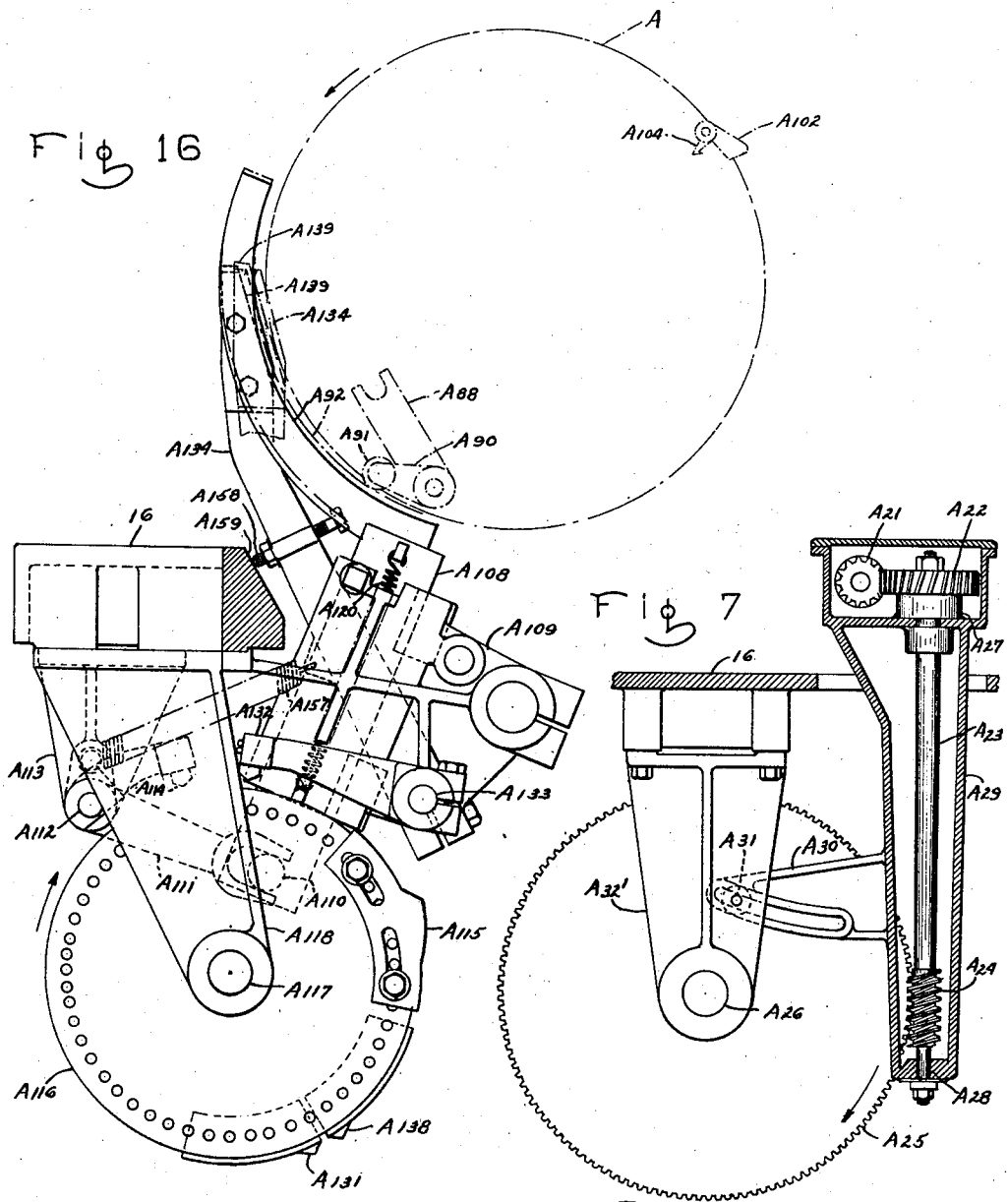

March 12, 1935.    J. FLAWS, JR    1,994,307
METHOD AND MACHINE FOR MAKING GRIDS
Filed June 4, 1932    9 Sheets-Sheet 5

INVENTOR
JOHN FLAWS JR
BY Charles Mullen
HIS ATTORNEY

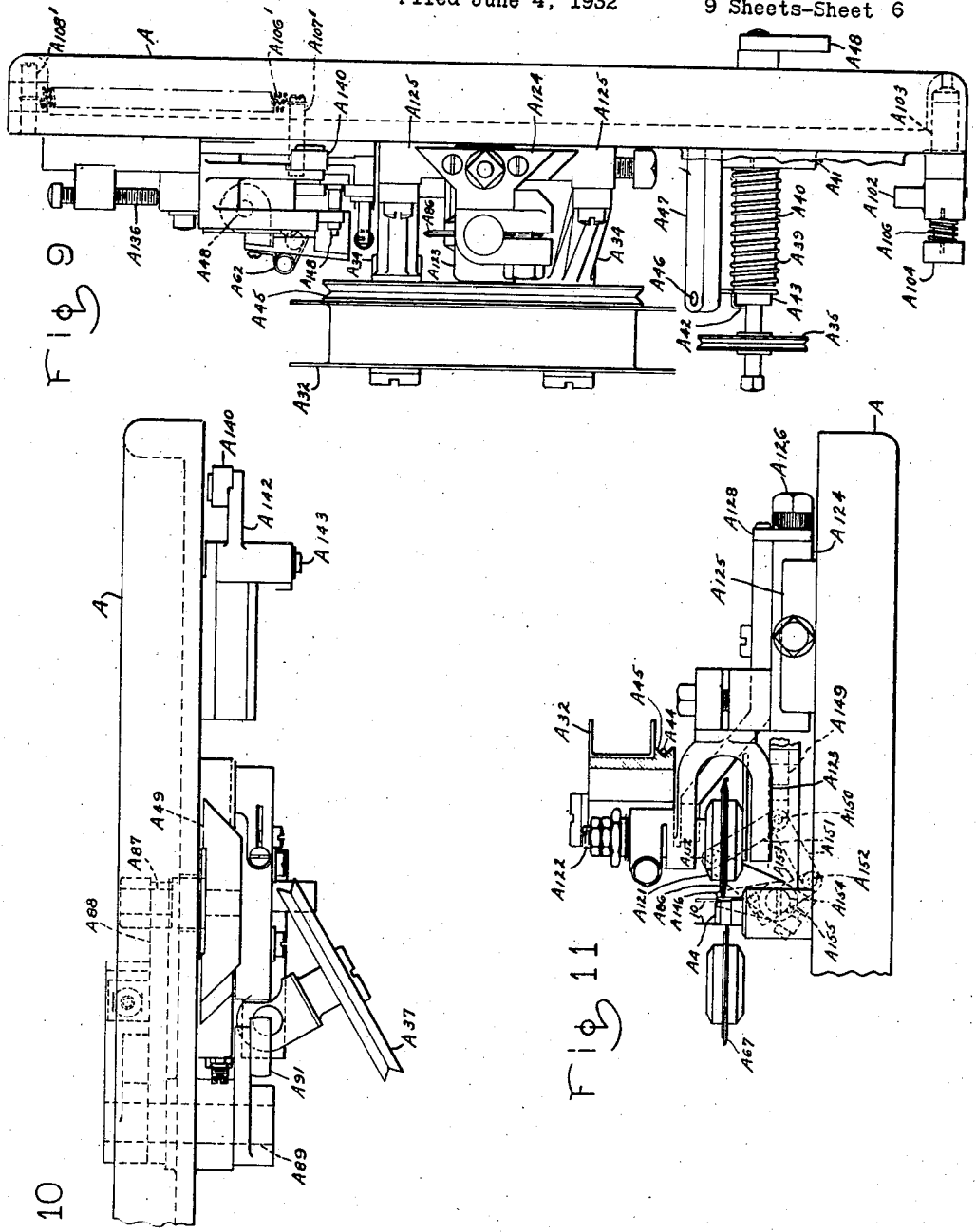

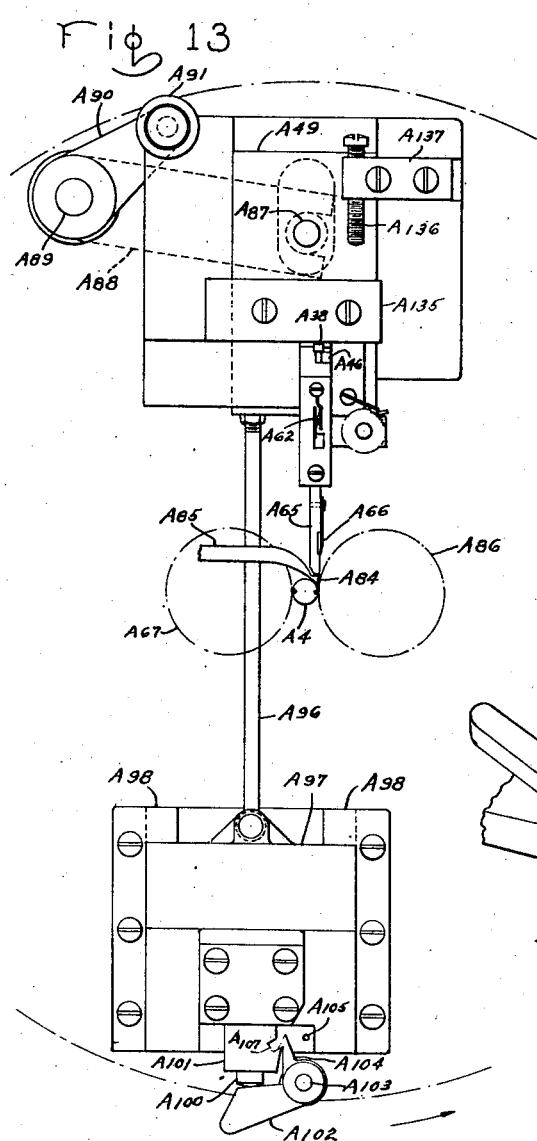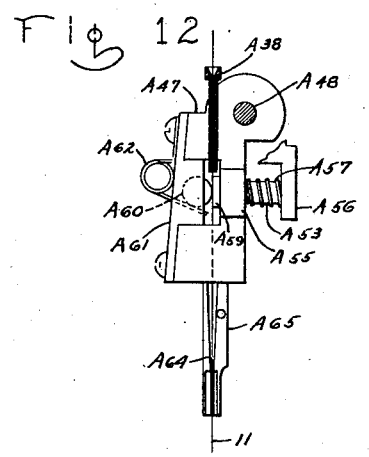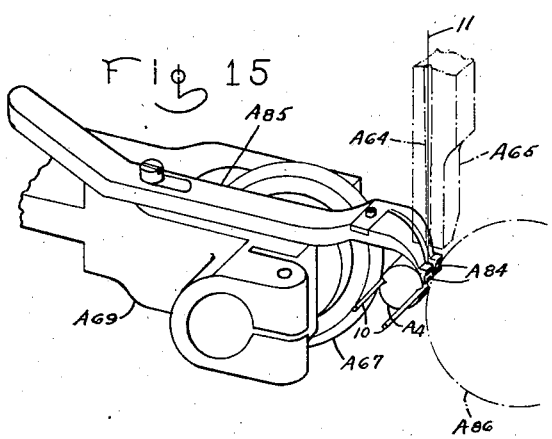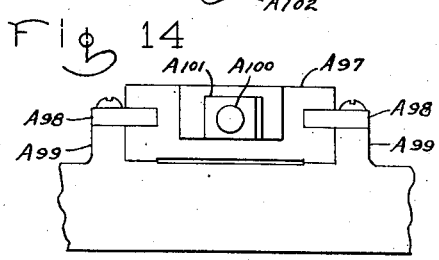

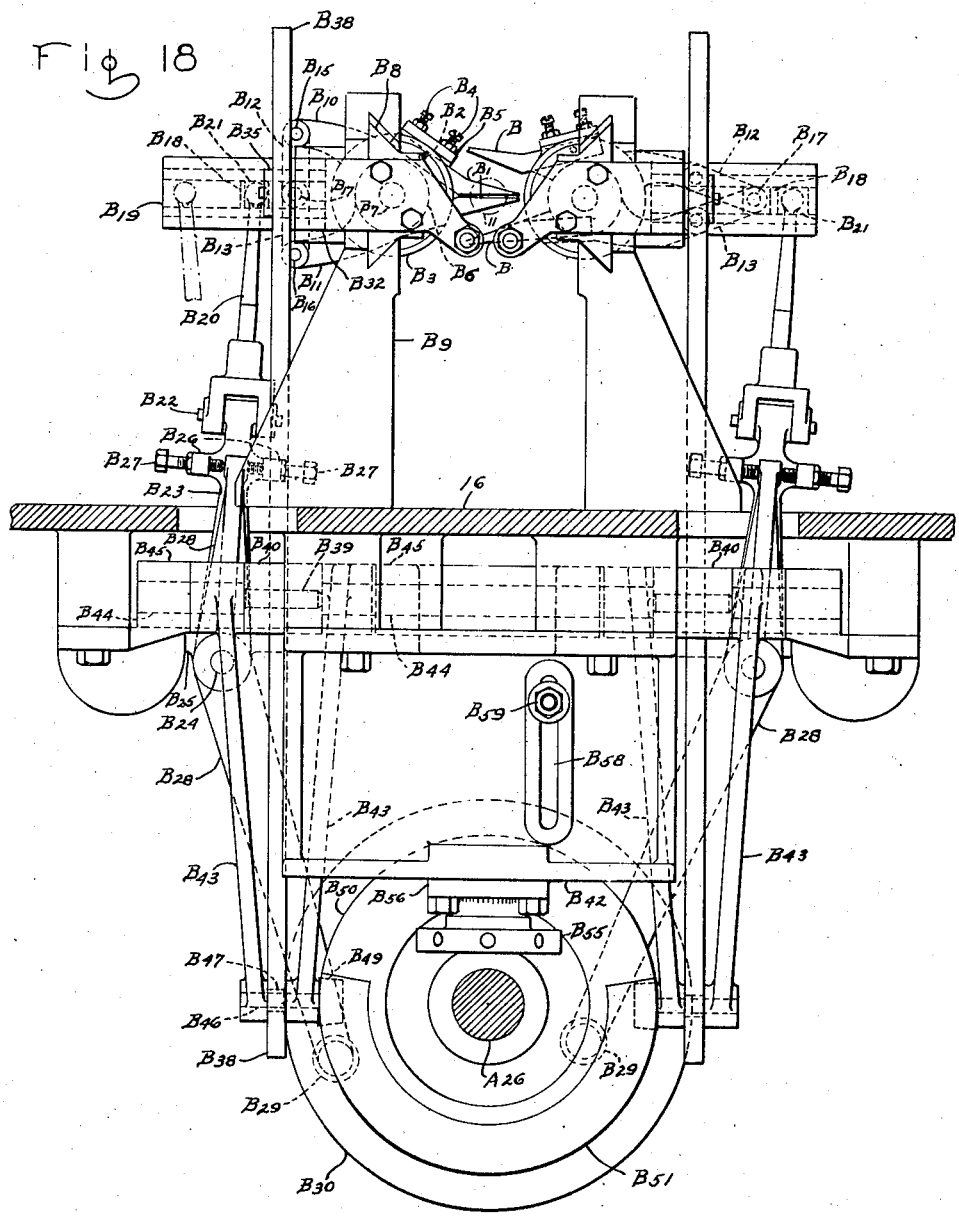

March 12, 1935.  J. FLAWS, JR  1,994,307
METHOD AND MACHINE FOR MAKING GRIDS
Filed June 4, 1932  9 Sheets-Sheet 9
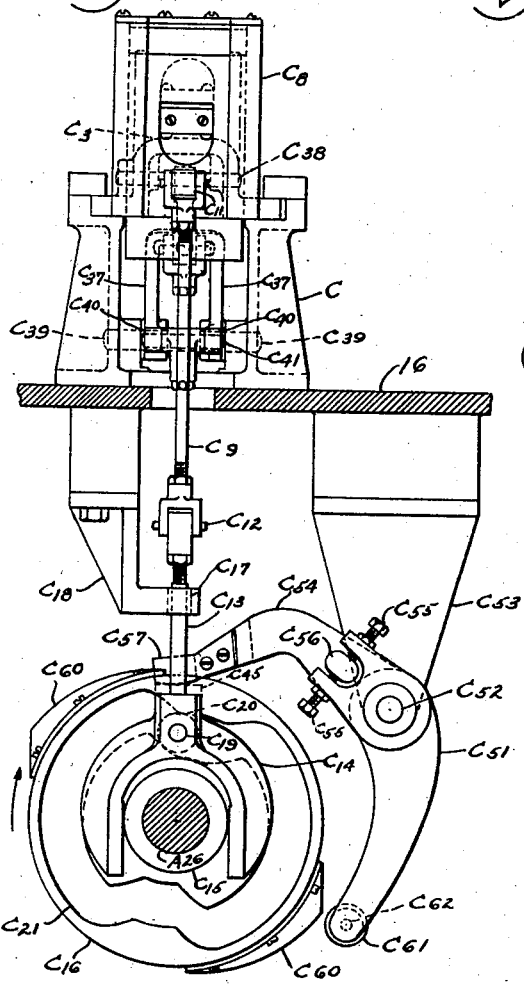
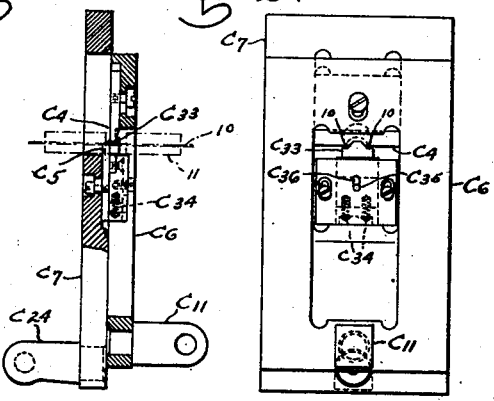
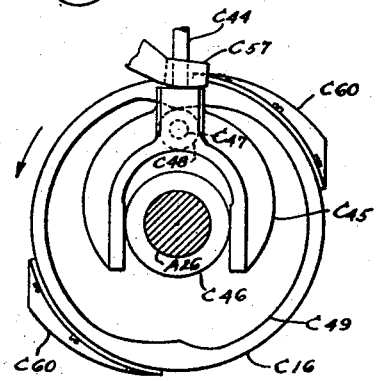
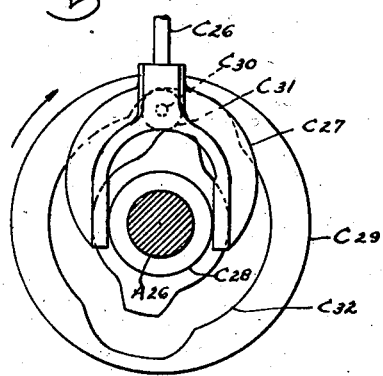
INVENTOR
JOHN FLAWS JR
BY
HIS ATTORNEY Patented Mar. 12, 1935

1,994,307

UNITED STATES PATENT OFFICE 1,994,307

METHOD AND MACHINE FOR MAKING GRIDS

John Flaws, Jr., Cleveland Heights, Ohio, assignor to General Electric Company, a corporation of New York Application June 4, 1932, Serial No. 615,363

24 Claims. (Cl. 140—71)

My invention relates to methods and machines for making grids comprising a plurality of support wires or side rods which serve to support a coil and hold the individual turns thereof in a fixed position with relation to each other. Such grids are used ordinarily in the construction of thermionic and electron discharge tubes and the like.

In grid winding machines as constructed at present the support wires are laid in a mandrel or arbor and the wire is coiled around them while the mandrel is being revolved. A disadvantage of this method is that it permits the winding of a single predetermined length of coil only, because it would be impractical to feed the revolving support wires continuously. The grid as used in the manufacture of electron discharge tubes comprises, however, a short length of coil or winding having short lengths of support wires extending past the ends of the winding which are used as leading-in wires. To provide for these extensions or lags in the present machines, the coils are continuously wound but are not affixed to the support wires at certain intervals. When cutting the coils thus wound to the proper lengths, the unattached portions are cut off and discarded.

One of the objects of my invention is to provide a machine which will wind coils of indefinite length. Another object of my invention is to provide in a grid winding machine, means for interrupting the winding of the coils of wire around the support wires at certain definite intervals. Still another object of my invention is to provide means for winding a coil of wire having variably pitched windings. With these objects in view, my invention comprises means for continuously feeding forward the support wires or side rods and means for winding the wire to be coiled around said support wires. A rotatable winding head comprises means by which the support wires are notched, the wire to be coiled is laid in the notch and then the notch is closed up, thus clamping the coiled wire to said support wires. Said winding head also comprises means for interrupting the feed of the wire to be coiled at certain definite intervals and then causing said feeding to be resumed. The grid structure thus wound, comprising a length of support wires having relatively short coils or windings or wire affixed thereto at definite intervals, passes on to a cutting off means which sever said support wires at a point between the successive coils or windings of grid wire. The means for notching the support wires comprises preferably a sharp edged disc which is adjustably mounted so that the distance between said notching disc and the swedging means comprising preferably another disc may be varied. Such variation of the distance between notcher and swedger together with a corresponding variation of the feed of the support wires or side rods produces a grid having variably pitched windings.

Other features and advantages of my invention will appear from the following detailed description of species thereof and from the drawings.

Figure 8:
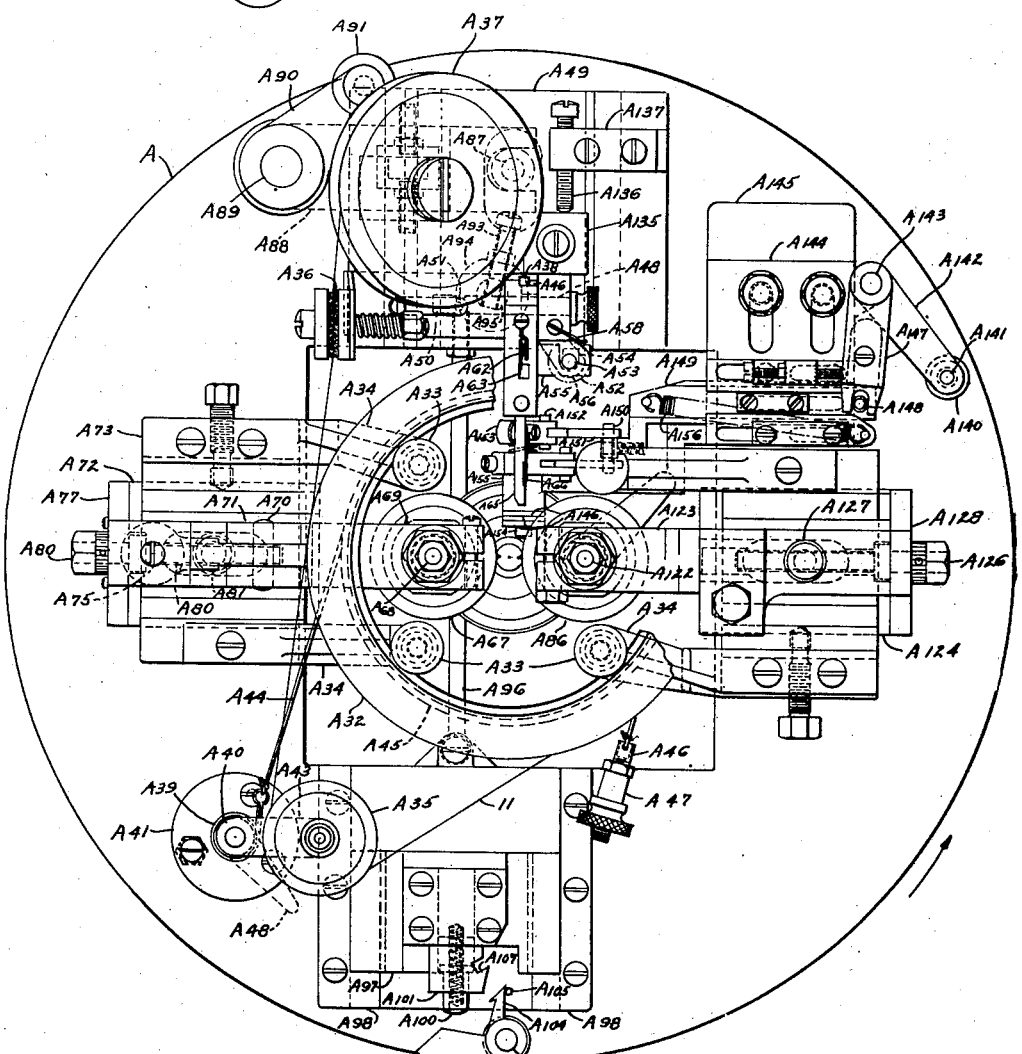
Figure 8:
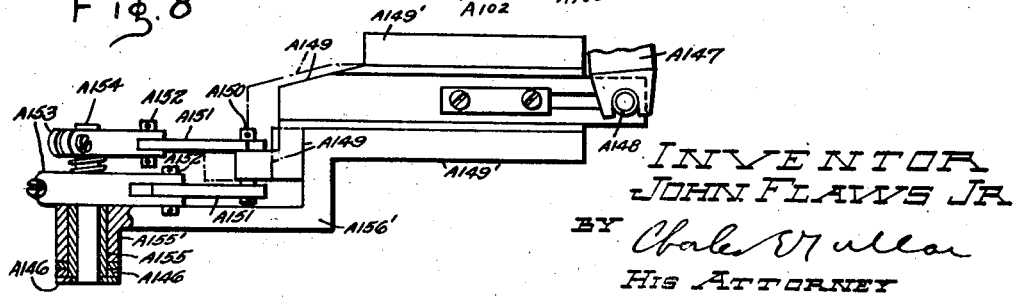

Referring to the drawings, Fig. 1 is an elevation of the device comprising my invention; Fig. 2 is a plan view thereof; Fig. 3 is a side view of a grid as made by my device; Fig. 4 is an end view thereof; Fig. 5 is a detailed view to a large scale of the method of securing the coiled wire to a support wire; Fig. 6 is a section through the winding head; Fig. 7 is an elevation of a worm drive to a cam shaft; Fig. 8 is a detailed front view of the winding head; Fig. 8' is an elevation of grid wire cutting mechanism; Fig. 9 is a side view thereof and Figs. 10 and 11 are detailed views of portions of the top and bottom views respectively; Fig. 12 is a detailed elevation of a grid wire feeding head; Fig. 13 is a detailed front view of grid wire feed starting means comprised in the winding head and Fig. 14 is a detailed bottom view of the lower end thereof; Fig. 15 is a detailed view in perspective of grid wire guiding fingers; Fig. 16 is a detailed elevation of grid wire starting mechanism; Fig. 17 is a detailed elevation of notch pitch adjusting mechanism; Fig. 18 is a detailed front elevation of the support wire or side rod feed mechanism; Fig. 19 is a detailed front elevation of the side rod cut-off mechanism; Figs. 20 and 21 are detailed side and front elevations to a larger scale, of the cut-off knives; and Figs. 22 and 23 are detailed views of cams used with the cut-off mechanism.

Referring to Fig. 3, the particular grid which this machine is adapted to make has two support wires or side rods 10, and comprises a helix or coil of grid wire 11, each turn of which is firmly embedded in said support wires. The grid wire is secured to the support wires by notching or slotting each of said support wires at intervals corresponding to the spacing of the turns of the grid, placing each turn in the corresponding notch or slot, and then closing or crimping said notches or slots to clamp the grid wire in place.

Each support wire 10 is fed in a continuous length from a spool 12 (Figs. 1 and 2) mounted on an arm 13 which is mounted on a standard 14. Said standard 14 is carried by a bracket 15 which is mounted on a table 16 which is supported by legs 17. Said support wires 10 pass over pulleys 18 and are straightened by passing through binding posts 19 mounted on a support 20 which also carries a pin 21 and arm 22 on which said pulleys 18 are mounted. The wires 10 pass through a revolving work head comprising a plate A mounted on a housing A1 (Fig. 6). Said wires 10 pass through a stationary guide A2 (Figs. 2 and 6) and V-shaped grooves A3 in a mandrel A4. Said guide A2 and mandrel A4 are mounted in an adapter A5 which is mounted in a chuck A6. Said chuck A6 is mounted in a sleeve A7 which is rigidly mounted in a support A8 mounted on the table 16. A sleeve A9 is screwed on the end of said chuck A6 and carries a handwheel A10 at the opposite end so that by turning said handwheel, said chuck may be opened or closed by moving it in the sleeve A7.

The housing A1 is mounted on ball bearings A11 and A12, the inner races of which are mounted on the fixed sleeve A7. Said housing A1 is revolved by a gear A13 mounted thereon which meshes with a gear A14 which is in turn driven by a pulley A15, belt A16, and pulley A17 from a motor A18. Said gear A14 and pulley A15 are mounted on a shaft A19 which is carried in bearings A20 mounted on the table 16. A spiral gear A21 on said shaft A19 meshes with another spiral gear A22 (Figs. 2 and 7) mounted on a shaft A23 which carries a worm gear A24 which engages a worm wheel A25 mounted on a cam shaft A26. Said shaft A23 is mounted in bearings A27, A28 in a housing A29 which is pivotally mounted on the shaft A19. A slotted arm A30 on said housing A29 is fastened to a bolt A31 in a support A32' which is mounted on the table 16 and carries the shaft A26.

Referring now to Figs. 8 to 11, the grid wire 11 is wound upon a spool A32 which is rotatably mounted on rollers A33 which are carried by lugs A34 mounted on the plate A. Said grid wire 11 is passed over a pulley A35, between a pair of felt wiping pads A36 and over another pulley A37 into a tube A38 (Fig. 12) of a grid wire guide. The pulley A35 is held in position by the tension of the grid wire 11 against the twisting action of a torsion spring A39 mounted on a pin A40 which is mounted in a boss A41 on the plate A. One end of said spring A39 is fixed to said boss A41 while a hook A42 in said spring bears against an arm A43 which is mounted on the pin A40 and carries the pulley A35. The upper end of said spring A39 is attached to a cord A44 which passes over a grooved pulley A45 mounted on the spool A32 and is fastened at the other end to a bolt A46 which is mounted in a post or body A47 on the plate A. If the grid wire 11 should happen to break during the revolution of the head A, the pulley A35 would swing in a clockwise direction about pin A40 in Fig. 8 due to spring A39, and a finger A48 mounted on the end of the pin A40 would likewise swing over and trip a switch (not shown) to disconnect the current supply to the motor A18 thereby stopping the machine. At the same time, the twisting of spring A39 would pull the cord A44 down tight against the pulley A45 and act as a brake to stop the rotation of the spool A32 on the rollers A33. Referring again to Fig. 12, the tube A38 which receives the grid wire 11 is mounted in a slot A46 (Fig. 13) in a body A47 which is pivotally mounted on a pin A48 (Fig. 8) which is mounted in a slide A49 and held in place by a leaf spring A50 mounted on said slide and engaging a slot A51 in said pin A48. Said body A47 is held down by a nut A52 which screws on a bolt A53 which passes through a slot A54 in a lug A55 on said body A47. Said bolt A53 is mounted in an ear A56 of said slide A49 and a spring A57 mounted on said bolt between said ear A56 and lug A55 holds said body A47 against said nut A52. Said nut A52 is provided with serrations along the circumference thereof which engage a leaf spring A58 mounted on said slide A49 to lock it in place. The grid wire 11 passes across the face of a disc A59 mounted in the body A47 and is held against said disc by a roller A60 mounted in a cover plate A61. Said plate A61 also carries a spring A62, one end of which passes through a hole A63 in said plate and bears against said roller A60 to hold it against said disc A59. Said roller A60 and disc A59 are preferably made of a hard substance such as cemented tungsten carbide. The wire 11 passes through said body A47 and through a groove A64 in a nose A65 mounted on said body A47 being held in said groove A64 by a leaf spring A66 mounted on said nose.

Referring to Figs. 6 and 8, a notcher A67 comprising a sharp-edged disc is rotatably mounted on a pin A68 which is mounted in a yoke A69. Said yoke A69 is pivotally mounted on a pin A70 in lugs A71 of a slide A72 which is mounted in ways of a boss A73 on the plate A. A leg A74 of said yoke A69 is normally held between an adjustable bolt A75 and a spring A76. Said bolt A75 is mounted in an arm A77 which is mounted on the slide A72 and said spring A76 is supported by a pin A78 one end of which is pressed into a hole in the slide A72, one end of said spring A76 being located in a recess A79 in said yoke leg A74. A lead screw A80, anchored between the slide A72 and arm A77, engages a nut A81 comprising a pin portion A82 which is pressed into a hole A83 in the plate A, thus providing for adjustment of the notcher A67, through the slide A72 and yoke A69, to control the depth of the notch made in the side rod wires 10. As the head plate A revolves, the notcher A67 being carried thereby passes across a side rod wire 10 to cut a notch 23 (Fig. 5) therein. As the head A revolves through 180° the end of the grid wire 11 is placed in the slot 23 as shown at $a$ (Fig. 5) by an inward movement of the nose A65 to the position shown in Fig. 13 during which said grid wire 11 is guided by a pair of fingers A84 (Fig. 15) into said slot 23. An extension A85 of said fingers A84 is mounted on the yoke A69 and is so shaped as to clear the notcher A67 and mandrel A4. The fingers A84 are adjusted with respect to a swedging roller A86 which peens over the notch 23 as shown at $b$ (Fig. 5).

The inward movement of the grid wire feeder comprising the nose portion A65 and body A47 is accomplished by an inward movement of the slide A49. Said slide A49 is actuated through a pin A87, mounted therein, by a lever A88 mounted on a pin A89 in the plate A. A lever A90 carrying a roller A91 is also mounted on said pin A89. The inward movement of said grid wire feeder A65, A47 from the position shown in Fig. 8 to that shown in Fig. 13 occurs when a segment A92 (Fig. 16) moves up to the position shown in dot-dash lines, said segment striking the roller A91 and moving it and the levers A88 and A90 to the position shown in Fig. 13. The movement of the slide A49 is limited by a stop bolt A93 mounted in a collar A94 which is mounted on a pin A95 in the head A. A bolt A96, mounted on the slide A49 is also attached to another slide A97 at the opposite side of the head A, said slide A97 being mounted on ways A98 (Fig. 14) which are mounted on lugs A99 on said head A. When the slide A49 moves toward the center of the head, the bolt A96 pushes the slide A97 out thereby causing a spring actuated pin A100 in a projection A101 on said slide A97 to strike an arm A102 pivotally mounted on a pin A103 in the head A. A notched finger A104 mounted on said pin A103, is normally held against a pin A105 in the head A by a torsion spring A106 (Fig. 9), but when the pin A100 turns the arm A102 it turns the finger A104 also and causes it to engage a notch A107 in said projection A101. The finger A104 serves to hold the slides A97 and A49 down against the pull of a spring A106' (Fig. 9) one end of which is mounted on a pin A107' mounted in the slide A49 while the other end is mounted on a pin A108' in the head A.

The segment A92 (Fig. 16) is mounted on a slide A108 which moves in a support A109 mounted on the table 16. A pin A110 in the lower end of said slide A108 engages the yoked end of an arm A111 pivotally mounted on a pin A112 in a support A113 on the table 16. A lever A114, mounted on said pin A112, is raised up by an adjustable cam dog A115 which is mounted on a cam wheel A116, cam wheel being mounted on a shaft A117 (see also Fig. 1) which is mounted in supports A118, A119 on the table 16. As a result of the raising of the lever A114 by the dog A115, the lever A111, slide A108 and segment A92 are raised so that the said segment causes the roller A91 (Fig. 13) to be moved in thereby moving the grid wire feed nose A65 in toward the mandrel A4. Immediately after the cam dog A115 passes the lever A114, the segment A92 is retracted by a spring A120 mounted on the slide A108 at one end and on the lower part of the support A109 at the other end.

Immediately after the grid wire 11 has been placed in the notch in the side rod wire 10, the swedging roller A86 (Fig. 11) passes across said notch and closes it up. Said swedging roller A86 is set 180° away from the notching roller A67 and a distance ahead of said notcher along the mandrel A4 corresponding to half the pitch of the helix to be formed by said grid wire. Said swedger A86 is mounted in a holder A121 on a pin A122 in a yoke A123 which is rigidly mounted in a slide A124. Said slide A124 is mounted in ways A125 on the head A. A lead screw A126 (Fig. 8), nut A127 and anchor plate A128, similar to the screw A80, nut A81 and arm A77 on the notcher assembly, serve to provide adjustment of the swedger A86 toward or away from the mandrel A4 to compensate for various sizes of mandrels, grid wires, or wearing down of said swedger.

The side rod wires 10 being fed along the mandrel A4 by means hereinafter explained, and the head A revolving, the notcher A67 cuts a notch 23 (Fig. 5) in said side rod 10, the grid wire 11 is pulled through the grid wire feed nose A65, (since it already has been clamped to the side rod) and wound around said mandrel A4 and passed through said notch, and at the next half revolution of the head said notch, with the grid wire therein, is closed up. Thus, in one complete revolution of the head A, a notch is cut in one of the side rods 10, a turn of grid wire is placed therein and said notch is closed over said grid wire. The cam wheel A116 which is driven by a gear A129 (Fig. 1) mounted on the shaft A26, is so geared down as to complete but one revolution during the entire length of a grid as shown in Fig. 3. A cam dog A131 (Fig. 16) on said wheel A116 raises a lever A132 mounted on a pin A133 in the support A109. An arm A134 mounted on said pin A133 is pivoted toward the center of the head A to the position shown by dot dash lines and thereby strikes the arm A102 (Fig. 13) which disengages the finger A104 from the slot A107 and allows the spring A108' (Fig. 9) to pull the slide A49 carrying the grid wire feed nose A65 up until a lug A135 therein hits a stop bolt A136 mounted in a lug A137 on the head A. The head A turns through approximately three revolutions between the time the cam dog A131 strikes the arm A132 and the time another cam dog A138 on the wheel A116 strikes said arm A132. The raising of the arm A132 causes the lever A134 to move in again as shown in Fig. 16 and a dog A139 mounted thereon strikes a roller A140 (Fig. 8) mounted on a pin A141 in an arm A142. Said arm A142 is pivotally mounted on a pin A143 mounted in a plate A144 which is mounted on a boss A145 in the head A. Said roller A140 and arm A142 operate a pair of grid wire cutoff knives A146. An arm A147 also mounted on the pin A143 engages a pin A148 mounted on a slide A149. Said slide A149 is slidably mounted in a guideway member A149' and carries a pin A150 (see also Fig. 11) on which are mounted a pair of links A151 which are connected through pins A152 to arms A153. Said arms A153 are connected through a pin A154 and sleeve A155 to each of the knives A146. Said sleeve A155 and pin A154 are mounted in a lug A155' on an arm A156' extending from the guide member A149'. A spring A156 mounted on the slide A149 at one end and on the plate A144 at the other end serves to immediately open said knives A146. With this cutting off one length of the grid is completely wound and during the time that the cam wheel A116 (Fig. 16) revolves after the cam dog A138 has passed the contact point of lever A132, until the cam dog A115 comes under the contact point of lever A114, no grid wire 11 is fed to the side rods 10, thus leaving a space between windings or coils of grid wire as at c (Fig. 2). When the cam dog A115 does come under the lever A114 it of course moves in the grid wire feed nose A65 and the winding operation is repeated. The retraction of lever A134 is performed by a spring A157 which pulls the said lever back until a bolt A158 mounted therein strikes a boss A159 on the table 16.

The operation of the head as thus far explained is suitable for the manufacture of constant pitch grids, that is, those in which the coil or helix of grid wire is wound about the side rods 10 at a constant pitch, but it is sometimes desirable to wind a grid of variable pitch such as that shown in Fig. 3, in which a section d of the coil at each end is of a smaller pitch than the middle section e. For this purpose a cam A160 (Fig. 6) is provided adjacent to the notcher yoke A69 and is pivotally mounted on a pin A161 in a lug A162 mounted on the head A. In the position shown in Fig. 6, the cam A160 is pressing against the notcher yoke A69 at its high point, said yoke being held thereagainst by the spring A76. In this position of the yoke A69 the notcher A67 is set off from the swedger a distance equal to half the pitch of the closely spaced windings of grid wire at d in Fig. 3 and said section d is then wound. When the end of the front section d of closely spaced windings has been reached the cam A160 is pivoted in a clockwise direction in Fig. 6 so that the leg A74 of the yoke A69 comes in contact with the stop screw A75. In this position of the yoke A69 the notcher A67 is set off from the swedger a distance equal to half the pitch of the more widely spaced windings at e, in Fig. 3. This moving of said notcher A67 together with a compensatory increase of the feed of the side rods 10 (hereinafter fully explained) produces said windings e. When the end of said section e has been reached, the cam A160 is pivoted back to the left, the side rod feed is reduced, and the end section d is wound.

A lever A163 (Figs. 6 and 17) is mounted on the pin A161 and connected through a ball joint to a link A164 which pases through a hole in the head A to a lever A165 to which it is connected by another ball joint. Said lever A165 is pivotally mounted on a pin A166 which is mounted in the housing A1 and carries a roller A167 at its other end. A spring A168, mounted on a pin A169 in the lever A163 and on a pin A170 in the head A, serves to hold the cam A160 in either its high or low position. The lever A165 is actuated by a pair of cam fingers A171, A172 (Figs. 1 and 17) which alternately strike the roller A167 and pivot the cam A160 to low and high position respectively through the link A164 and lever A163. The finger A171 is mounted on a sleeve A173 which is mounted in a support A174 on the table 16, while the finger A172 is mounted on a shaft A175 which is rotatably mounted in said sleeve A173. An arm A176 is mounted on the sleeve A173 and is fastened by a pin A177 to a link A178 which is fastened by a pin A179 to a lever A180. Said lever A180 is pivotally mounted on a pin A181 in the support A119. An arm A182 mounted on the pin A181 is actuated by a cam dog A183 mounted on a wheel A184 which is mounted on the shaft A117. An arm A185, mounted on the shaft A175 is connected through a pin A186 to a link A187 which is connected through a pin A188 to a lever arm A189. An arm A190 mounted on the pin A181 is actuated by a cam dog A191 on the wheel A184. When the cam dog A183 strikes the lever arm A182, the cam finger A171 is pivoted clockwise in Fig. 1 and strikes the roller A167 which has revolved into position between said finger A171 and finger A172 and thus the link A164 is moved to the left by lever A165 in Fig. 6, the cam A160 is pivoted clockwise and the yoke A69 is pivoted counterclockwise wh'ch provides the setting for the middle section e (Fig. 3) of coarsely pitched windings. When the end of the section e is reached, the cam dog A191 strikes the arm A190 which causes the cam finger A172 to pivot to the left in Fig. 1 and strike the roller A167 so that the cam A160 is pivoted to the left in Fig. 6 to provide the setting of notcher A67 which will produce the finely pitched windings d (Fig. 3). Springs A192 and A193 connected to the end of levers A180, and A189 respectively, act to retract the cam fingers A172 and A171 respectively, after they have tripped the roller A167.

*Side rod feed mechanism.*—The side rod wires 10 are fed by two pairs of jaws B and B1 (Figs. 2 and 18). In the position shown in said Figs. 2 and 18, the jaws B1 are closed with the side rod wires 10 gripped therebetween at a point between consecutive windings or coils of grid wire 11 and the jaws B are in an open position to the right of said jaws B1. The closed jaws B1 are moved to the right in Fig. 2 to the position shown by dot-dash lines, thus pulling the side rod wires 10 across the mandrel A4. Just before said jaws B1 reach the end of their travel to the right, the jaws B which have in turn moved to the left, are closed so that they grip the side rods at the next point c which is devoid of grid wire 11 and start to travel to the right while the jaws B1 are still gripping said side rod wires 10. When jaws B1 have reached the end of their travel they are opened and then moved back to the left over jaws B to their original position where they are ready to close upon and grip the side rod wire when said jaws B are reaching the end of their travel to the right.

Since the actuating mechanism for both pairs of jaws is the same, only that of jaws B1 will be described. The upper jaw B1 is mounted on a pin B2 in a slot in a disc B3 and is held in place by bolts B4 mounted in a plate B5 on said disc B3. Said bolts B4 are located on opposite sides of the pin B2 and allow the upper jaw B1 to be set with respect to the lower jaw B1 to provide the proper grip for different sizes of side rod wire. The lower jaw B1 is mounted on a disc B6 which, together with disc B3, is mounted on a pin B7 which is mounted in a slide B8 which reciprocates in a support B9 mounted on the table 16. The discs B3, B6 have ears B10, B11 respectively which are connected to links B12, B13, through pins B15, B16. Said links B12, B13 are mounted on a pin B17 in a block B18 which slides in a cross rail B19 mounted on the slide B8. The ball shaped end of a lever B20 is located in a hole B21 in the block B18 while the other end of said lever B20 is pivotally mounted on a pin B22 in an arm B23 which is pivotally mounted on a pin B24 in a support B25 on the table 16. The arm B23 is connected through lugs B26 and bolts B27 therein to the upper leg of a lever B28 which is pivotally mounted on the pin B24. The lower leg of said lever B28 carries a roller B29 which engages a cam B30 mounted on the shaft A26. The roller B29 of the opposite lever B28 which actuates jaws B engages a cam track in the body of the gear A130 which is similar to that of the cam B30. When the lever B28, through the cam B30, is pivoted about the pin B24 it causes the arm B23 to pivot also and the arm B20 attached thereto causes the block B18 to reciprocate in the cross rail B19 which then acts upon the links B12, B13 to cause the jaws B1 to be opened or closed by the rotation of the discs B3, B6. The slides B8 carry lugs B31, B32 at each end in which are mounted an adjusting screw B33 and a rod B34 which carry a block B35. A pin B36 is said block B35 engages a slot B37 in the upper end of an actuating lever B38 which is pivotally mounted on a pin B39. Said pin B39 is mounted in a lug B40 on a slide B41 which is mounted in a support B42 on the table 16. A channel shaped bracket B43 is pivotally mounted on pins B44 in bearings B45 mounted on the table 16. Said bracket B43 encloses the lever B38 and carries at its lower end a pin B46 which carries a roller B47 which engages a slot B48 in said lever B38. Said pin B46 also carries a roller B49 which engages a cam B50 mounted on the shaft A26. As shown in Figs. 1 and 18, the upper half of the cam B50 controls the return travel (to the left in Fig. 1) of the jaws B, B1, through the lever B38 and slide B8. The lower half of the cam B50 comprises a removable segment B51 which controls the forward feed of the jaws B, B1 and is so designed as to vary the feed of said jaws when changing from the closely pitched portions d (Fig. 3) of the grid to the more widely spaced portion e. A spring B52 mounted on the lug B31 of the slide B8 and on a pin C1 in a cutter support C on the table 16 serves to keep the roller B49 against the face B53 of the cam segment B51. The distance traveled by the jaws B, B1 may be varied by means of a lead screw B54 mounted in the slide B41 which carries the lever B38. A head B55 of said lead screw B54 is held in a lug B56 on the support B42. When said slide B41 is moved up or down the lever B38 is moved with respect to the bracket B43 and pin B46 therein, thereby varying the ratio of the distance between the pin B39 and pin B46 with respect to the distance between said pin B39 and pin B36. A stud B57 mounted on the slide B41 and passing through a slot B58 in the support B42 is used to clamp said slide B41 in position by means of a nut B59.

After passing from the side rod feed, the grids are guided through a tube C2 mounted on a slide C3 which reciprocates on the cutter support C. Said grids pass between a pair of knives C4, C5 which cut the side rods 10 at the midpoint of the section "c". Referring to Figs. 1 and 19, said knives C4, C5 are mounted in slides C6, C7 (Fig. 20) which are mounted in an upright portion C8 of the slide C3. The knife C4 is actuated by a link C9 which is mounted on a pin C10 in a lug C11 on said slide C6. Said link C9 is connected by a pin C12 to a rod C13 on which is mounted a yoke C14 which straddles a hub C15 of a cam wheel C16 which is mounted on the shaft A26. Said rod C13 passes through a hole C17 in a support C18 which is mounted on the table 16. The yoke C14 carries a pin C19 on which is mounted a roller C20 which engages a cam track C21 in the cam wheel C16. The slide C7 is actuated by a link C22 which is mounted on a pin C23 in a lug C24 on said slide C7. The link C22 is connected by a pin C25 to a rod C26 on which is mounted a yoke C27 (Fig. 23) which straddles a hub C28 of a cam wheel C29 mounted on the shaft A26. A pin C30 mounted in said yoke C27 carries a roller C31 which engages a cam track C32 in the cam wheel C29. A wire guide C33 (Figs. 20 and 21) is slidably mounted in the slide C6 and is actuated by springs C34. As the cutter slide C6 moves up, said guide C33, projecting above the knife C5, goes up between the side rods 10 and carries them up to the knife C4. Said side rods 10 are then held each against said knife C4 so as to insure a clean cut off. The guide C33 is prevented from moving up too far when in a non-operative position, by a pin C35 mounted therein which slides in a slot C36 in the slide C6.

In order to prevent buckling of the side rods 10 during the cut-off, the knife assembly is moved forward at the same speed at which said side rods are fed along. The slide C3 is actuated by a yoke lever C37 which engages a pin C38 in said slide C3 and is pivotally mounted on pins C39 in the base or support C. Lower arms C40 of said lever C37 are connected through a pin C41 to a link C42 which is connected by a pin C43 to a rod C44. A yoke C45 (Fig. 22) mounted on said rod C44 straddles a hub C46 on the cam wheel C16 and carries a pin C47 on which is mounted a roller C48 which engages a single track cam C49 in the cam wheel C16. Said roller C48 is held up against said cam track C49 by a spring C50. Referring to Fig. 19 a lever C51 is pivotally mounted on a pin C52 in a support C53 on the table 16. Said lever C51 is connected to an arm C54, which is mounted on the pin C52, by means of bolts C55 which are screwed up against a lug C56 on the arm C54. A pair of fingers C57 at the end of said arm C54 straddle the rod C44 and rest against the top of yoke C45 due to the weight of the lever C51. A spring C58 (Fig. 1) is mounted on a pin C59 in the slide C3 and on a pin B60 in the side rod support B9. Said spring C58 serves to retract the slide C3. When the slide C3 and cutters C4, C5 are in the retracted position and the side rods 10 with coils 11 have been fed to the position shown in Fig. 20, the forward end of a compensating cam segment C60 mounted on the cam wheel C16 engages a roller C61 mounted on a pin C62 in the end of the lever C51. This causes the lever C51 to be pivoted counter clockwise about the pin C52 in Fig. 19, thus pulling the roller C47 (Fig. 22) away from the cam track C49 and pulling the rod C44, link C42 and arms C40 down. The cam segment C60 is so designed as to cause the slide C3 to be fed forward at a speed equal to the feed of the side rods 10. When the roller C61 reaches the back or high part of said segment C60, the low part of the cam track C49 re-engages the roller C48, the side rods having just been cut by the knives C4, C5, and imparts a quick forward movement to the slide C3 and knives C4, C5. In this movement a grid of the form shown in Fig. 3 is pushed onto the fingers D (Fig. 1) of a grid spreading device forming the subject of a separate application Serial No. 607,143, filed April 23, 1932. The operation of the entire machine is as follows: Referring to Figs. 1 and 2, a pair of support wires 10 are unwound from reels 12, passing over pulleys 18 and being drawn horizontally through an opening in a revolving head A by two pairs of reciprocating jaws B—B1. The said wires 10 are drawn along V-shaped grooves A3 on opposite sides of a stationary mandrel A4. Notches 23 (Fig. 5) are cut in said wire 10 by a sharp edged notching disc A67 (Fig. 8) which is mounted on the revolving winding head A. When the head has revolved through 180° the end of a grid wire 11 (Fig. 12) is placed in the notch 23 in one of the wires 10 by an inward movement of a grid wire feeder nose A65, and immediately thereafter a swedging disc A86 (Fig. 13) passes over said notch 23 and firmly embeds the grid wire therein. The said grid wire 11 is unwound from a spool A32 mounted on the head A. After a definite number of turns of grid wire have been wound, a pair of knives A146, also mounted on head A, are actuated to sever the grid wire. Since the support wires 10 are being drawn along continuously, portions of the support wires 10 remain free of turns of grid wire until the feeder nose A65 is again moved in to wind another series of turns of wire. Referring to Fig. 6, the notching disc A67 is mounted in a yoke A69 which is pivotally mounted on a pin A70 and actuated at predetermined intervals by a cam A160 so that by correspondingly varying the feed of the support wires 10 a varying pitch is imparted to the turns of grid wire, as represented by c and d in Fig. 3. A grid having turns of uniform pitch may be wound by merely disconnecting the actuating mechanisms for the cam A160 and the variable feeding of the support wires. The support wires, with their series of turns of grid wire affixed thereto, pass to a pair of cutters C4, C5 (Fig. 20) which sever said support wires at a point midway between successive series of turns. By means of cam mechanism the cutters C4, C5 are moved forward in the same direction and at the same speed as the support wires 10, thus preventing buckling of the continuously moving support wires during the severing operation.

What I claim as new and desire to secure by Letters Patent of the United States, is:

1. The method of making a grid which comprises feeding a support wire along a stationary mandrel, forming slots in spaced relation along said support wire, winding a series of turns of grid wire about said support wire with said turns of said grid wire in said slots, closing up said slots to secure said turns of grid wire therein, severing said grid wire, and winding another series of turns of grid wire about an adjacent portion of said support wire without interrupting the feed thereof, thereby providing a portion of said support wire between said series of turns which is free of grid wire.

2. The method of making a grid which comprises feeding a support wire along a stationary mandrel, forming slots in spaced relation along said support wire, winding a series of turns of grid wire from a revolving head about said support wire with said turns of said grid wire in said slots, closing up said slots to secure said turns of grid wire therein, severing said grid wire with a cutter mounted on said revolving head, and winding another series of turns of grid wire about an adjacent portion of said support wire without interrupting the feed thereof, thereby providing a portion of said support wire between said series of turns which is free of grid wire.

3. The method of making a grid which comprises feeding a support wire along a mandrel, winding a series of turns of grid wire about said support wire, securing said turns of grid wire to said support wire, and moving the grid wire securing means and varying the feed of said support wire in proper time relation thereto to vary the pitch of said turns of grid wire.

4. The method of making a grid which comprises feeding a support wire along a mandrel, forming slots in spaced relation along said support wire, winding a series of turns of grid wire about said support wire with said turns of said grid wire in said slots, varying the spacing of said slots and the feed of said support wire in proper time relation to provide a variable pitch winding and closing up said slots to secure said windings of grid wire therein.

5. The method of making a grid which comprises feeding a support wire along a stationary mandrel, forming slots in spaced relation along said support wire, winding a series of turns of grid wire about said support wire with said turns of said grid wire in said slots, varying the spacing of said slots and the feed of said support wire in proper time relation to provide a variable pitch winding and closing up said slots to secure said windings of grid wire therein.

6. The method of making a grid which comprises feeding a support wire along a stationary mandrel, forming slots in spaced relation along said support wire, winding a series of turns of grid wire about said support wire with said turns of said grid wire in said slots, varying the spacing of said slots and the feed of said support wire in proper time relation to provide a variable pitch winding, closing up said slots to secure said windings of grid wire therein, severing said grid wire, and winding another series of turns of grid wire about an adjacent portion of said support wire without interrupting the feed thereof, thereby providing a portion of said support wire between said series of turns which is free of grid wire.

7. The method of making a grid which comprises feeding a support wire along a mandrel, winding a series of closely spaced turns of grid wire about said support wire, increasing the feed of said support wire to provide a series of turns of lesser pitch, then decreasing the feed of said support wire to provide another series of closely spaced turns of grid wire, and securing said turns of grid wire to said support wire by moving the securing means in proper time relation to the feed of said support wires.

8. The method of making a grid which comprises feeding a support wire along a mandrel, forming slots in closely spaced relation along said support wire, winding a series of turns of grid wire about said support wire with said turns of said grid wire in said slots, increasing the spacing of said slots and the feed of said support wire to provide a series of turns of lesser pitch, then decreasing the spacing of said slots and the feed of said support wire to provide another series of closely spaced turns of grid wire, and securing said turns of grid wire to said support wire.

9. In a machine for making grids, the combination of a fixed mandrel for holding a support wire, a rotatable head mounted so as to rotate about said mandrel, a support wire feed for continuously feeding forward said support wire, a grid wire feed mounted on said head for winding a series of turns of grid wire about said support wire, mechanism for securing said turns of said grid wire to said support wire, a cutter mounted on said head adjacent to the path of travel of said grid wire, mechanism for actuating said cutter to sever said grid wire without interrupting the feed of the support wire, mechanism for actuating said grid wire feed to wind another series of turns about said support wire, and means for causing said mechanisms to operate in proper time relation.

10. In a machine for making grids, the combination of a fixed mandrel for holding a support wire, a rotatable head mounted so as to rotate about said mandrel, a support wire feed for continuously feeding forward said support wire, a grid wire feed mounted on said head for winding a series of turns of grid wire about said support wire, mechanism for securing said turns of said grid wire to said support wire, said grid wire feed comprising a spool for holding a quantity of grid wire, a guide nose through which said grid wire passes mounted in juxtaposition with said grid wire securing mechanism, and mechanism for actuating said nose to deliver the end of said grid wire between said support wire and said grid wire securing mechanism, mechanism for actuating said grid wire securing mechanism to secure the said end of said grid wire to said support wire, a cutter mounted on said head adjacent to the path of travel of said grid wire, mechanism for actuating said cutter to sever said grid wire after a predetermined number of turns of grid wire have been wound around said support wire, mechanism for actuating said grid wire feed to wind another series of turns about said support wire, and means for causing said mechanisms to operate in proper time relation.

11. In a machine for making grids, the combination of a fixed mandrel for holding a support wire, a rotatable head mounted so as to rotate about said mandrel, a support wire feed for continuously feeding forward said support wire, a grid wire feed mounted on said head for winding a series of turns of grid wire about said support wire, mechanism for securing said turns of said grid wire to said support wire, said grid wire feed comprising a spool for holding a quantity of grid wire, a guide nose through which said grid wire passes mounted in juxtaposition with said grid wire securing mechanism, a grid wire guide member disposed adjacent to said grid wire securing mechanism and said support wire and mechanism for actuating said nose to deliver the end of said grid wire through said guide member between said support wire and said grid wire securing mechanism, mechanism for actuating said grid wire securing mechanism to secure the said end of said grid wire to said support wire, a cutter mounted on said head adjacent to the path of travel of said grid wire, mechanism for actuating said cutter to sever said grid wire after a predetermined number of turns of grid wire have been wound around said support wire, mechanism for actuating said grid wire feed to wind another series of turns about said support wire, and means for causing said mechanisms to operate in proper time relation.

12. In a machine of the character described, the combination of a fixed mandrel for holding a support wire, a rotatable head mounted so as to rotate about said mandrel, a support wire feed for continuously feeding forward said support wire, a grid wire feed mounted on said head for winding a series of turns of grid wire about said support wire, and mechanism for securing said turns of said grid wire to said support wire, said grid wire feed mechanism comprising a spool for holding a quantity of grid wire, a guide nose through which said grid wire passes mounted in juxtaposition with said grid wire securing mechanism and mechanism for actuating said guide nose to deliver the end of said grid wire between said support wire and said grid wire securing mechanism, and mechanism for actuating said grid wire securing mechanism to secure the said end of said grid wire to said support wire.

13. In a machine of the character described, the combination of a fixed mandrel for holding a support wire, a rotatable head mounted so as to rotate about said mandrel, a support wire feed for continuously feeding forward said support wire, a grid wire feed mounted on said head for winding a series of turns of grid wire about said support wire, and mechanism for securing said turns of said grid wire to said support wire, said grid wire feed mechanism comprising a spool for holding a quantity of grid wire, a guide nose through which said grid wire passes mounted in juxtaposition with said grid wire securing mechanism and mechanism for actuating said guide nose to deliver the end of said grid wire between said support wire and said grid wire securing mechanism, mechanism for actuating said grid wire securing mechanism to secure the said end of said grid wire to said support wire, a cutter mounted on said head adjacent to the path of travel of said grid wire, mechanism for retracting the said grid wire guide nose, mechanism for actuating said cutter to sever said grid wire after a predetermined number of turns of grid wire have been wound around said support wire, mechanism for actuating said grid wire guide nose to wind another series of turns of grid wire about said support wire, and means for causing said mechanism to operate in proper time relation.

14. In a machine for making grids, the combination of a fixed mandrel for holding support wires, a rotatable head mounted so as to rotate about said mandrel, a notcher mounted on said head for forming slots in spaced relation along said support wires, a support wire feed for continuously feeding forward said support wires, a grid wire feed mounted on said head for winding a series of turns of grid wire about said support wires with the turns thereof in said slots in said support wires, a swedger carried by said rotatable head for closing up said slots to secure said turns of said grid wire therein, a cutter mounted on said head adjacent to the path of travel of said grid wire, mechanism for actuating said cutter to sever said grid wire without interrupting the feed of the support wire, mechanism for actuating said grid wire feed to wind another series of turns about said support wires, and means for causing said mechanisms to operate in proper time relation.

15. In a machine for making grids, the combination of a mandrel for holding a support wire, a support wire feed for feeding forward said support wire, a grid wire feed for winding a series of turns of grid wire about said support wire, mechanism for securing said turns of said grid wire to said support wire, cam operated mechanisms for moving said grid wire securing mechanism and varying the speed of said support wire feed in proper time relation thereto to vary the pitch of said turns of grid wire.

16. In a machine for making grids, the combination of a fixed mandrel for holding a support wire, a rotatable head mounted so as to rotate about said mandrel, a support wire feed for continuously feeding forward said support wire, a grid wire feed mounted on said head for winding a series of turns of grid wire about said support wire, mechanism for securing said turns of said grid wire to said support wire, cam operated mechanism on said head for moving said grid wire securing mechanism and mechanism for varying the speed of said support wire feed in proper time relation thereto to vary the pitch of said turns of grid wire.

17. In a machine for making grids, the combination of a fixed mandrel for holding support wires, a rotatable head mounted so as to rotate about said mandrel, a notcher mounted on said head for forming slots in spaced relation along said support wires, a support wire feed for continuously feeding forward said support wires, a grid wire feed mounted on said head for winding a series of turns of grid wire about said support wires with the turns thereof in said slots in said support wires, a swedger carried by said rotatable head for closing up said slots to secure said turns of said grid wire therein, a cutter mounted on said head adjacent to the path of travel of said grid wire, mechanism for actuating said cutter to sever said grid wire, mechanism for actuating said grid wire feed to wind another series of turns about said support wires, a support wire cutter mounted adjacent to the path of travel of said support wires, mechanism for actuating said support wire cutter to sever said support wires at a point between adjacent series of turns of grid wire, and means for causing said mechanisms to operate in proper time relation.

18. In a machine for making grids, the combination of a fixed mandrel for holding support wires, a rotatable head mounted so as to rotate about said mandrel, a notcher mounted on said head for forming slots in spaced relation along said support wires, a support wire feed for continuously feeding forward said support wires, a grid wire feed mounted on said head for winding a series of turns of grid wire about said support wires with the turns thereof in said slots in said support wires, cam operated mechanism on said head for moving said notcher to vary the pitch of said turns of grid wire and cam operated mechanism for varying the speed of said support wire feed in proper time relation thereto, a swedger carried by said rotatable head for closing up said slots to secure said turns of said grid wire therein, a cutter mounted on said head adjacent to the path of travel of said grid wire, mechanism for actuating said cutter to sever said grid wire, mechanism for actuating said grid wire feed to wind another series of turns about said support wires, and means for causing said mechanisms to operate in proper time relation.

19. In a machine for making grids, the combination of a fixed mandrel for holding support wires, a rotatable head mounted so as to rotate about said mandrel, a notcher mounted on said head for forming slots in spaced relation along said support wires, a support wire feed for continuously feeding forward said support wires, a grid wire feed mounted on said head for winding a series of turns of grid wire about said support wires with the turns thereof in said slots in said support wires, cam operated mechanism on said head for moving said notcher to vary the pitch of said turns of grid wire and cam operated mechanism for varying the speed of said support wire feed in proper time relation thereto, and a swedger carried by said rotatable head for closing up said slots to secure said turns of said grid wire therein.

20. In a machine for making grids, the combination of a fixed mandrel for holding support wires, a rotatable head mounted so as to rotate about said mandrel, a notcher mounted on said head for forming slots in spaced relation along said support wires, a support wire feed for continuously feeding forward said support wires, a grid wire feed mounted on said head for winding a series of closely spaced turns of grid wire about said support wires with the turns thereof in said slots in said support wires, cam operated mechanism on said head for moving said notcher to decrease the pitch of said turns of grid wire and cam operated mechanism for increasing the speed of said support wire feed in proper time relation thereto, mechanism for moving said notcher to increase the pitch of said turns of grid wire and mechanism for decreasing the speed of said support wire feed in proper time relation thereto to provide another closely spaced series of turns of grid wire, and a swedger carried by said rotatable head for closing up said slots to secure said turns of said grid wire therein.

21. In a machine of the class described, support wire feed mechanism comprising two pairs of cooperating jaws, means for closing one of said pairs of jaws to grip the support wire, means for moving said jaws forward to feed said support wire, means for closing the second of said pairs of jaws, means for moving said second pair of jaws forward and means for opening and retracting the first pair of jaws while said second pair of jaws are moving forward, said second pair of jaws passing through said opened first pair of jaws during the retraction thereof.

22. In a machine of the class described, support wire feed mechanism comprising two pairs of cooperating jaws, means for closing one of said pairs of jaws to grip the support wire, means for moving said jaws forward in a straight line to feed said support wire, means for closing the second of said pairs of jaws, means for moving said second pair of jaws forward in a straight line parallel to the line of movement of the first pair of jaws, and means for opening and retracting said first pair of jaws while said second pair of jaws are moving forward, said second pair of jaws passing through said opened first pair of jaws during the retraction thereof.

23. In a machine of the class described, a cutter mounted adjacent to the path of travel of a grid structure comprising a plurality of spaced series of turns of grid wire secured to a support wire, cam actuated mechanism for causing said cutter to move in the direction of and at the same speed as said grid structure, and mechanism for actuating said cutter to sever said support wire at a point between each of said series of turns of grid wire.

24. In a machine of the class described, a cutter mounted adjacent to the path of travel of a grid structure comprising a plurality of spaced series of turns of grid wire secured to a support wire, cam actuated mechanism for causing said cutter to move in the direction of and at the same speed as said grid structure, mechanism for actuating said cutter to sever said support wire at a point between each of said series of turns of grid wire, a mandrel mounted in the path of travel of said grid structure, and mechanism for imparting a rapid movement to said cutter to cause said severed portion of grid structure to be delivered thereby to said mandrel.

JOHN FLAWS, JR.